(12) United States Patent
Noguchi

(10) Patent No.: US 11,550,152 B2
(45) Date of Patent: Jan. 10, 2023

(54) DISPLAY DEVICE

(71) Applicant: SEIKO EPSON CORPORATION, Tokyo (JP)

(72) Inventor: Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 253 days.

(21) Appl. No.: 16/827,767

(22) Filed: Mar. 24, 2020

(65) Prior Publication Data
US 2020/0310130 A1 Oct. 1, 2020

(30) Foreign Application Priority Data
Mar. 25, 2019 (JP) .............................. JP2019-056422

(51) Int. Cl.
*G02B 27/01* (2006.01)
*F21V 8/00* (2006.01)
*G03H 1/02* (2006.01)

(52) U.S. Cl.
CPC ....... *G02B 27/0172* (2013.01); *G02B 6/0016* (2013.01); *G02B 6/0038* (2013.01); *G03H 1/0248* (2013.01); *G02B 2027/0174* (2013.01)

(58) Field of Classification Search
CPC .............. G02B 27/0172; G02B 6/0016; G02B 6/0038; G02B 2027/0174; G03H 1/0248
USPC ........................................................ 359/13
See application file for complete search history.

(56) References Cited

U.S. PATENT DOCUMENTS

| | | | |
|---|---|---|---|
| 5,224,198 A * | 6/1993 | Jachimowicz | G02C 9/00 359/13 |
| 6,094,283 A * | 7/2000 | Preston | G03H 1/28 359/24 |
| 6,611,385 B2 * | 8/2003 | Song | G02B 27/0172 359/566 |
| 8,320,032 B2 * | 11/2012 | Levola | G02B 27/0081 359/13 |
| 8,654,420 B2 * | 2/2014 | Simmonds | G02B 27/01 359/13 |
| 8,885,259 B2 * | 11/2014 | Mukawa | G02B 27/149 359/13 |
| 9,400,395 B2 * | 7/2016 | Travers | G02B 27/4272 |
| 10,061,124 B2 * | 8/2018 | Tervo | G02B 27/4205 |

(Continued)

FOREIGN PATENT DOCUMENTS

| | | |
|---|---|---|
| JP | 2005-241825 A | 9/2005 |
| JP | 2008-287049 A | 11/2008 |
| JP | 2010-44172 A | 2/2010 |
| JP | 2017-58400 A | 3/2017 |

(Continued)

*Primary Examiner* — Collin X Beatty
(74) *Attorney, Agent, or Firm* — Oliff PLC

(57) ABSTRACT

In a display device, an image having an aspect not equal to 1 is formed by an image forming unit configured to form an image, and the image is guided as an image light to a display position by an optical system. The optical system, which is provided with a diffraction optical element, deflects the image light. In the diffraction optical element, a pitch direction of a pattern for deflecting the image light coincides with a direction in which the aspect of the image is narrow. In the display device, the direction in which the image light is deflected by the diffraction optical element coincides with the direction in which the aspect of the image formed is narrow, thus making it possible to suppress unevenness of brightness and hue within a plane of an image displayed.

9 Claims, 11 Drawing Sheets

(56) References Cited

U.S. PATENT DOCUMENTS

| | | | |
|---|---|---|---|
| 11,262,490 B2* | 3/2022 | Lee | G02B 27/0081 |
| 2001/0055131 A1* | 12/2001 | Suganuma | G02B 27/0944 |
| | | | 359/1 |
| 2006/0228073 A1 | 10/2006 | Mukawa et al. | |
| 2007/0188837 A1* | 8/2007 | Shimizu | G02B 27/0172 |
| | | | 359/13 |
| 2008/0239424 A1 | 10/2008 | Mukawa et al. | |
| 2010/0157400 A1* | 6/2010 | Dimov | G02B 27/0172 |
| | | | 359/13 |
| 2010/0177388 A1* | 7/2010 | Cohen | G02B 27/0081 |
| | | | 359/566 |
| 2010/0220295 A1 | 9/2010 | Mukawa et al. | |
| 2011/0211239 A1 | 9/2011 | Mukawa et al. | |
| 2012/0081789 A1 | 4/2012 | Mukawa et al. | |
| 2012/0206811 A1 | 8/2012 | Mukawa et al. | |
| 2013/0155513 A1 | 6/2013 | Mukawa et al. | |
| 2015/0355467 A1 | 12/2015 | Mukawa et al. | |
| 2016/0041393 A1* | 2/2016 | Inagaki | G02B 27/4211 |
| | | | 359/13 |
| 2016/0170215 A1 | 6/2016 | Mukawa et al. | |
| 2017/0131551 A1* | 5/2017 | Robbins | G02F 1/13439 |
| 2017/0131552 A1 | 5/2017 | Yokoyama | |
| 2017/0153454 A1* | 6/2017 | Callier | G02B 5/22 |
| 2018/0143437 A1* | 5/2018 | Kimmel | G06F 1/163 |
| 2020/0089012 A1* | 3/2020 | Koshihara | G02B 27/102 |

FOREIGN PATENT DOCUMENTS

| | | |
|---|---|---|
| JP | 2017-90562 A | 5/2017 |
| JP | 2019-39973 A | 3/2019 |
| WO | 2005/093493 A1 | 10/2005 |

\* cited by examiner

DISPLAY DEVICE

The present application is based on, and claims priority from JP Application Serial Number 2019-056422, filed Mar. 25, 2019, the disclosure of which is hereby incorporated by reference herein in its entirety.

BACKGROUND

1. Technical Field

The present disclosure relates to a display device using a diffraction optical element.

2. Related Art

In recent years, a variety of display devices of an eyeglasses type have been proposed. Such display devices are required to be miniaturized or thinned, whether the display device itself is transparent and of a see-through type that enables the external scene to be visible. The display device includes an image forming unit configured to form an image, a display unit disposed in front of the eyes to display an image, and a light guide unit configured to couple these units. In general, the light guide unit guides incident light inside of the light guide unit while the incident light repeats total reflection. Accordingly, in attempting to miniaturize and thin the display device, the traveling direction of the light needs to be greatly changed in order to guide light from the image forming unit to the light guide unit. This is also applicable to a case when guiding light from the light guide unit to the display unit. For achieving these purposes, a diffraction optical element (also referred to as a holographic optical element) is used (for example, JP 2017-58400 A).

Unfortunately, as for the diffraction optical element, the diffraction efficiency varies depending on the viewing angle of light being incident. Thus, the difference in the viewing angles of light from the image forming unit causes an issue in which brightness differs depending on the positions on the screen. When displaying a plurality of colors, the distribution of diffraction efficiency is varied for each of the wavelengths, resulting in color unevenness. In case of a single color, unevenness in brightness occurs.

SUMMARY

The present disclosure can be achieved in the form of the following embodiments or application examples.

As a first aspect of the present disclosure, a display device is provided. The display device includes an image forming unit configured to form an image having an aspect ratio not equal to 1:1 and to emit the image as image light, an optical system configured to guide the image light to a display position, and a first diffraction optical element having a pattern that diffracts light and configured to deflect the image light in the optical system, in which the first diffraction optical element is disposed such that, at a plane of the first diffraction optical element on which the image light is incident, a pitch direction of the pattern coincides with a direction in which an aspect of the image is narrow.

DESCRIPTION OF EXEMPLARY EMBODIMENTS

A. First Embodiment

Figure 1:
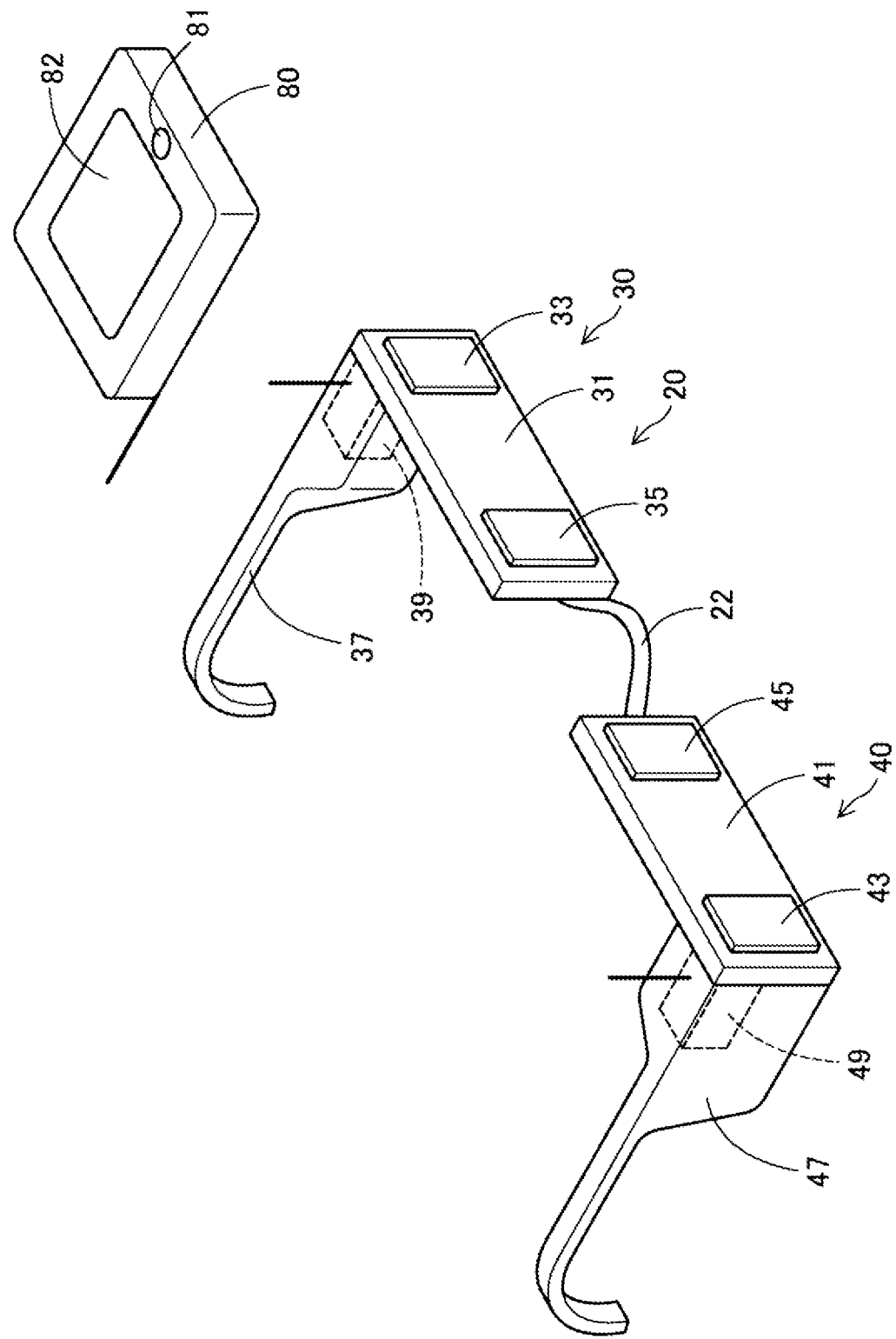
FIG. 1 is a perspective view of a display device according to a first embodiment.

FIG. 1 is a perspective view of a display device 20 according to the first embodiment. As illustrated in FIG. 1, the display device 20 is of so-called eyeglasses type, and is a so-called see-through type, which the user can view the external scene through the display device 20. The display device 20 includes a left-eye display unit 30 and a right-eye display unit 40 arranged left and right as viewed from the user, a bridge 22 coupling both the display units 30 and 40, a left temple 37 attached to the end portion of the left-eye display unit 30, and a right temple 47 attached to the end portion of the right-eye display unit 40, a left image forming unit 39 built into the thick portion of the left temple 37, a right image forming unit 49 built into the thick portion of the left temple 37, and an image transmission device 80 configured to wirelessly send image data to these left image forming unit 39 and right image forming unit 49.

The image transmission device 80 is a terminal that can edit and store pictures, images, and the like, and is achieved, for example, as a smart phone, tablet, or the like, or as a dedicated device. The image transmission device 80 includes an activation button 81 for activation, and a display 82 in which a touch panel is overlaid on the surface, and is configured to send still images such as stored pictures, videos, and the like that are stored, to the left and right image forming units 39 and 49. The tip ends of the left and right temples 37 and 47, which are curved downward as temple tips, are used to mount the display device 20 on the auriculae of the user.

Figure 2:
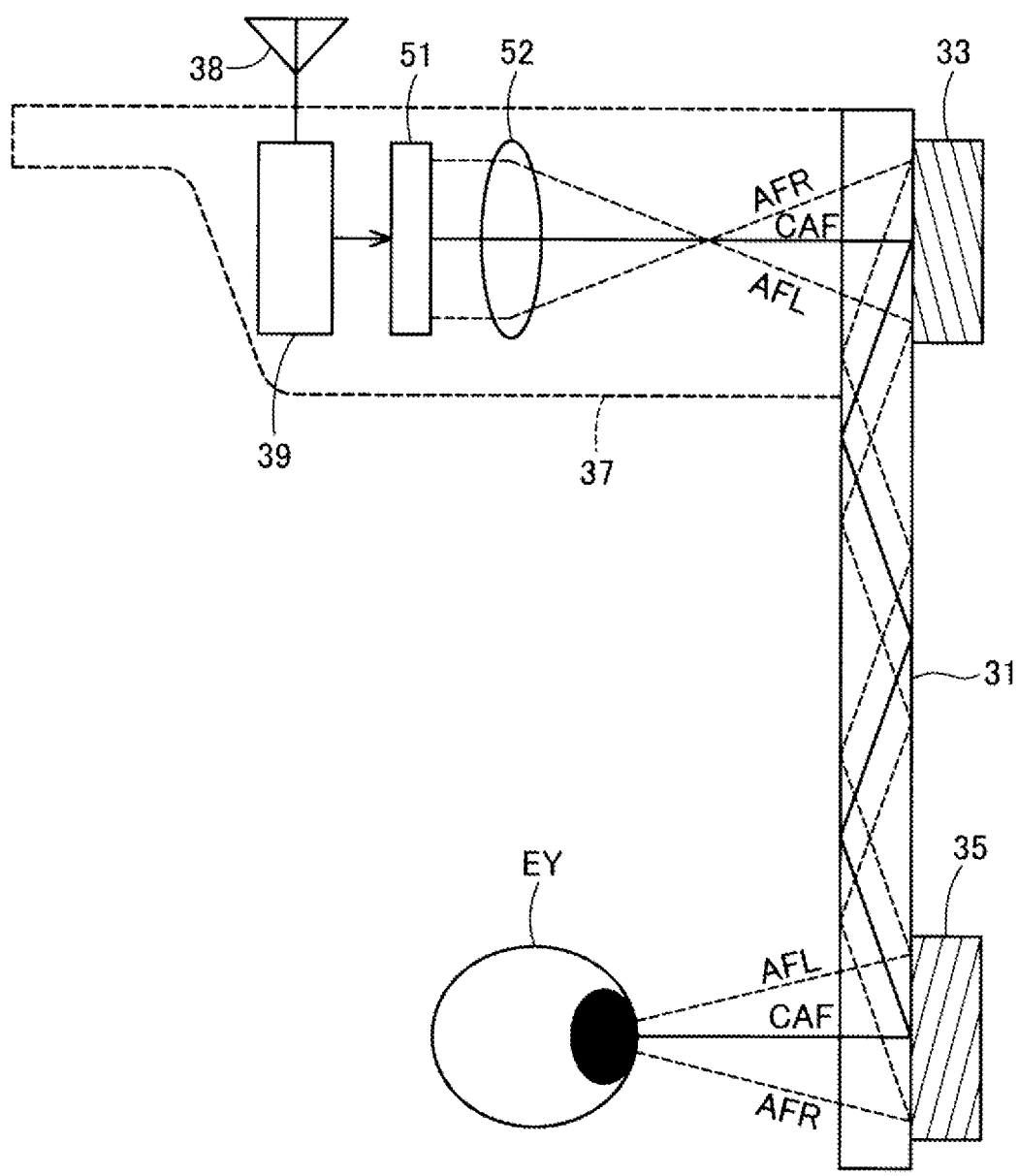
FIG. 2 is an explanatory view schematically illustrating a configuration of a left-eye display unit.

The left-eye display unit 30 and the right-eye display unit 40 have the same structure as each other except that components are arranged in left-right symmetry. Thus, the structure is described below using the left-eye display unit 30 as an example, and the configuration and function of each of the portions are the same as those of the right-eye display unit 40. FIG. 2 is an explanatory view schematically illustrating a configuration of the left-eye display unit 30. As illustrated in the figure, the image forming unit 39 built into the left temple 37, upon receiving an image from the image transmission device 80 via an antenna 38, forms the received image on an EL display 51. The EL display 51 is a display in which microelements that produce luminescence of three primary colors of RGB are arrayed. The size and resolution of the EL display 51 will be described later. The image formed on the EL display 51 is emitted as image light from the EL display 51 to be collimated by a collimating lens 52. Then, the image light enters the left-eye display unit 30. Note that, in place of the EL display 51, a combination of a backlight that functions as a light source and an LCD, a display in which micro-sized LEDs are arrayed, or a combination of a laser diode and an MMD may be used. Hereinafter, the EL display 51 is simply referred to as display 51 as well. The image formed on the EL display 51 may be a still image or a moving image. The image may also be a single colored image including a monochrome image, or a colored image.

The left-eye display unit 30 includes an incident diffraction optical element 33 and an emission diffraction optical element 35 on a face on the opposite side of the plane, in the vicinity of both the end portions of a light guide body 31, on which light from the EL display 51 is incident. In the first embodiment, the incident diffraction optical element 33 and the emission diffraction optical element 35 employ a reflection-type volume hologram (also referred to as a reflection-type volume holographic element) provided with a pattern that produces diffraction of light. Light incident through the collimating lens 52 greatly changes the traveling direction of the light by the incident diffraction optical element 33 and travels through the interior of the light guide body 31 while being totally reflected by the boundary surface of the light guide body 31. The light then greatly changes its traveling direction in the emission diffraction optical element 35 to the direction of a pupil EY of the user wearing the display device 20.

The diffraction optical elements employed as the incident diffraction optical element 33 and the emission diffraction optical element 35 are reflection-type volume holograms, and include interference fringes as a pattern for diffraction. The interference fringes have a structure in which planar layers having different refractive indices from one another are alternately layered along a predetermined direction (pitch direction). Provided that the interval between the interference fringes along the predetermined direction is a pitch d, and the wavelength of the light being incident is $\lambda$, the interference fringes diffract the incident light in an angular direction $\alpha$ satisfying Equation (1) below.

$$d \cdot \sin \alpha = m \cdot \lambda \quad (1)$$

Note that in Equation (1), m is the order, and in general, the diffracted light in the direction of m=1 is dominant. The pattern of the interference fringes and the like formed in the incident diffraction optical element 33 and the emission diffraction optical element 35 is for deflecting the light. Thus, the pitch direction of the pattern is inclined in the direction in which light is guided with respect to the traveling direction of the incident light, and is inclined with respect to the plane on which the incident light is incident. Accordingly, on the plane on which the incident light is incident of the reflection-type volume hologram, a pattern of interference fringes and the like extending in the direction intersecting the direction in which light is guided is disposed at a pitch different from the pitch d along the direction in which light is guided. In the first embodiment, the emission diffraction optical element 35 corresponds to the first diffraction optical element, and the incident diffraction optical element 33 corresponds to the second diffraction optical element, however, when using a single diffraction optical element, the incident diffraction optical element 33 used at the incident side of the light guide body 31 corresponds to the first diffraction optical element.

Figure 3:
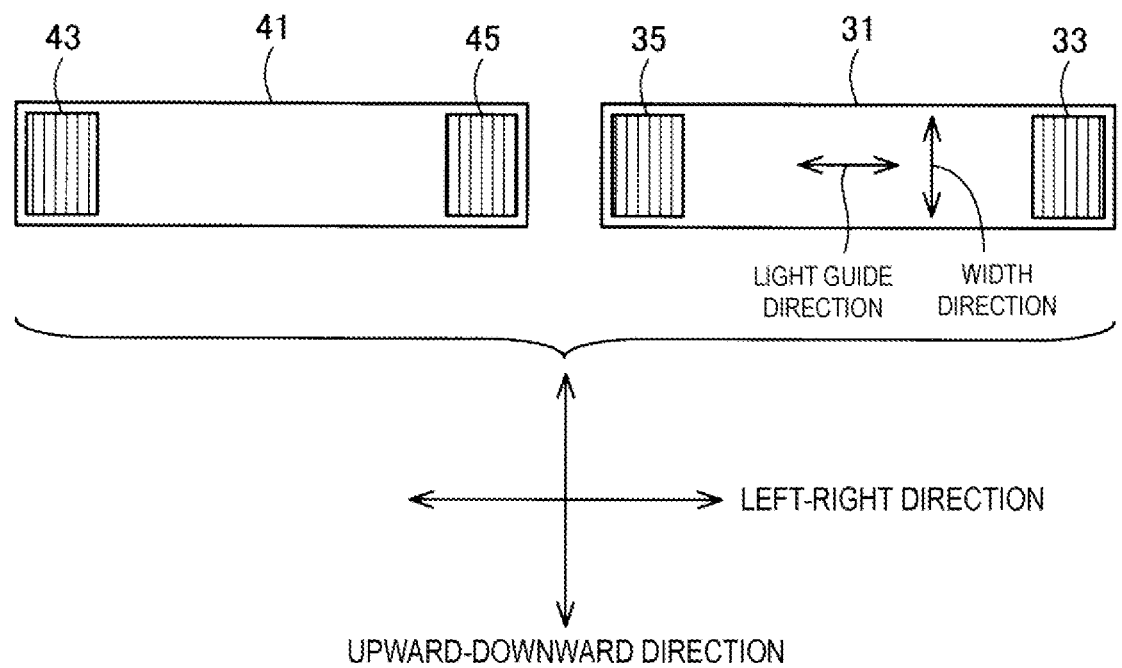
FIG. 3 is an explanatory view for defining a direction in accordance with a first embodiment.

In the first embodiment, as illustrated in FIGS. 1 and 3, the light guide bodies 31 and 41 are arranged to guide light in the alignment direction of both eyes of the user. The designation of the directions in this specification including other embodiments will be described below. As illustrated in FIG. 3, the gravitational direction when the user standing upright wears the display device 20 is referred to as downward direction, and the opposite direction of the downward direction is referred to as upward direction. With respect to the head, the direction is referred to as upward-downward direction. Further, the alignment direction of both eyes, which is approximately orthogonal to the upward-downward direction, is referred to as left-right direction. In the first embodiment, the left-eye display unit 30 and the right-eye display unit 40 are aligned along the left-right direction. On the other hand, as for the light guide bodies 31 and 41, the direction in which light is guided inside of the light guide bodies 31 and 41 (in general, the longitudinal direction of the light guide bodies 31 and 41) is referred to as light guide direction, and the direction orthogonal to the light guide direction, within the plane in which the incident diffraction optical element 33 and the emission diffraction optical element 35 of the light guide bodies 31 and 41 are provided, is referred to as width direction. In the first embodiment, the left-right direction coincides with the light guide direction, and the upward-downward direction coincides with the width direction.

Figure 4:
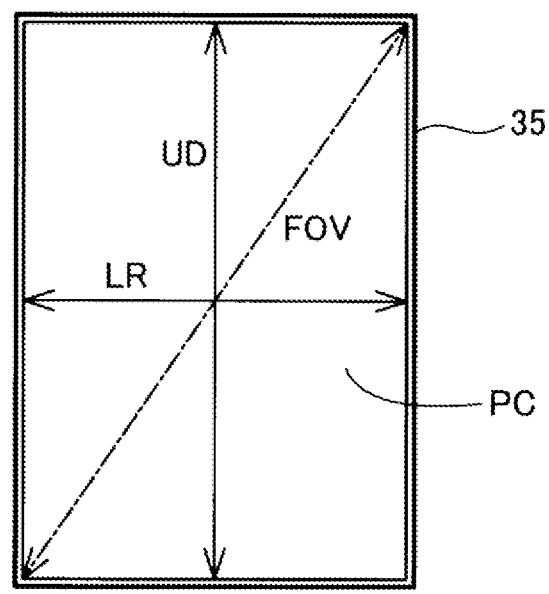
FIG. 4 is an explanatory view illustrating a relationship between an emission diffraction optical element and an image.

As illustrated in FIG. 4, in the first embodiment, an image PC formed by the display 51 differs in the ratio of longitudinal and lateral dimensions (hereinafter, referred to as aspect ratio). That is, in the first embodiment, the aspect ratio of the formed image is not equal to 1:1. In general, an aspect ratio represents the ratio of the long side:the ratio of the short side. Thus, in the first embodiment, the value of the aspect ratio is greater than the value of 1. Thus, even for images of an identical aspect ratio, the terms "longitudinally elongated" and "laterally elongated" are used in this specification when needed to distinguish between a longitudinally elongated image and a laterally elongated image. A longitudinally elongated image, when observed from the side on which the image is viewed, is handled as representing a longitudinally long image, which is an image having a dimension greater in the upward-downward or front-rear direction than the dimension in the left-right direction. A laterally elongated image, contrary to this, is handled as representing an image having a dimension greater in the front-rear direction than the dimension in the upward-downward or the front-rear direction. In the former, the direction in which the aspect is narrow coincides with the lateral (left-right) direction, and in the latter, the direction in which the aspect is wide coincides with the lateral (left-right) direction.

The light from the image PC formed on the EL display 51 is guided from the incident diffraction optical element 33, through the light guide body 31, to the emission diffraction optical element 35. At this time, the shape of the image PC guided through the light guide bodies 31 and 41 to enter the pupil of the user is associated with the direction in which light is guided by the display units 30 and 40 at the left and right. Such a situation will be described below. The shape of the image PC is set such that the dimension in the direction of diffraction by the incident diffraction optical element 33 and the emission diffraction optical element 35, that is, the dimension along the light guide direction, is less than the dimension along the width direction of the light guide bodies 31 and 41. In the first embodiment, the image formed in the emission diffraction optical element 35 (image viewed from the user) is longitudinally elongated, as illustrated in FIG. 4.

As illustrated in FIG. 3, when the display device 20 is configured to cause the left-eye display unit 30 and the right-eye display unit 40 to guide light along the left-right direction (horizontal direction), the image PC formed is longitudinally elongated, as illustrated in FIG. 4. The image PC is an image with a diagonal length FOV, wherein the image, the height UD is greater than the width LR. In contrast, even for an image with a diagonal length FOV of an identical length, there is possibly an image in which the height UD is less than the width LR (laterally elongated image). Here, the term "height" refers to a dimension in the upward-downward direction when the image is disposed within a plane including the upward-downward direction, and the term width refers to a dimension in a direction orthogonal to the upward-downward direction. In the first embodiment, the image is formed longitudinally elongated, as described above. This is because, in the first embodiment, the light guide bodies 31 and 41 are arranged, as already described, such that the direction in which light is guided coincides with the horizontal direction (direction approximately orthogonal to the upward-downward direction). The reason for this will be described later in detail.

Figure 5:
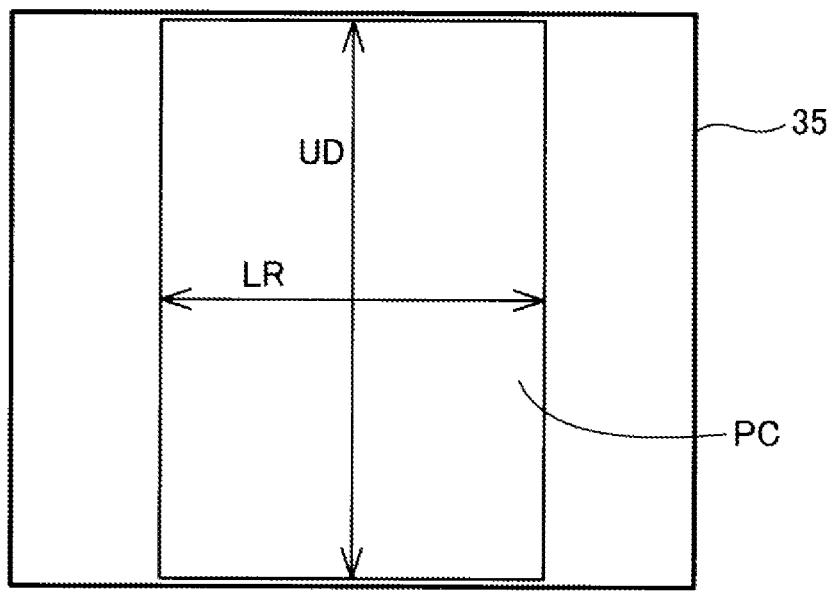
FIG. 5 is an explanatory view illustrating a relationship between a size of an emission diffraction optical element and a shape of an image.

The size of the image PC does not necessarily coincide with the sizes of the incident diffraction optical element 33 and the emission diffraction optical element 35. As illustrated in FIG. 5, assuming that the image PC is longitudinally elongated, the emission diffraction optical element 35 may be larger than the image PC as long as the shape of the image PC is held as is, and the emission diffraction optical element 35 is permitted to be laterally elongated. This also applies to the relationship between the image PC and the incident diffraction optical element 33.

Figure 6:
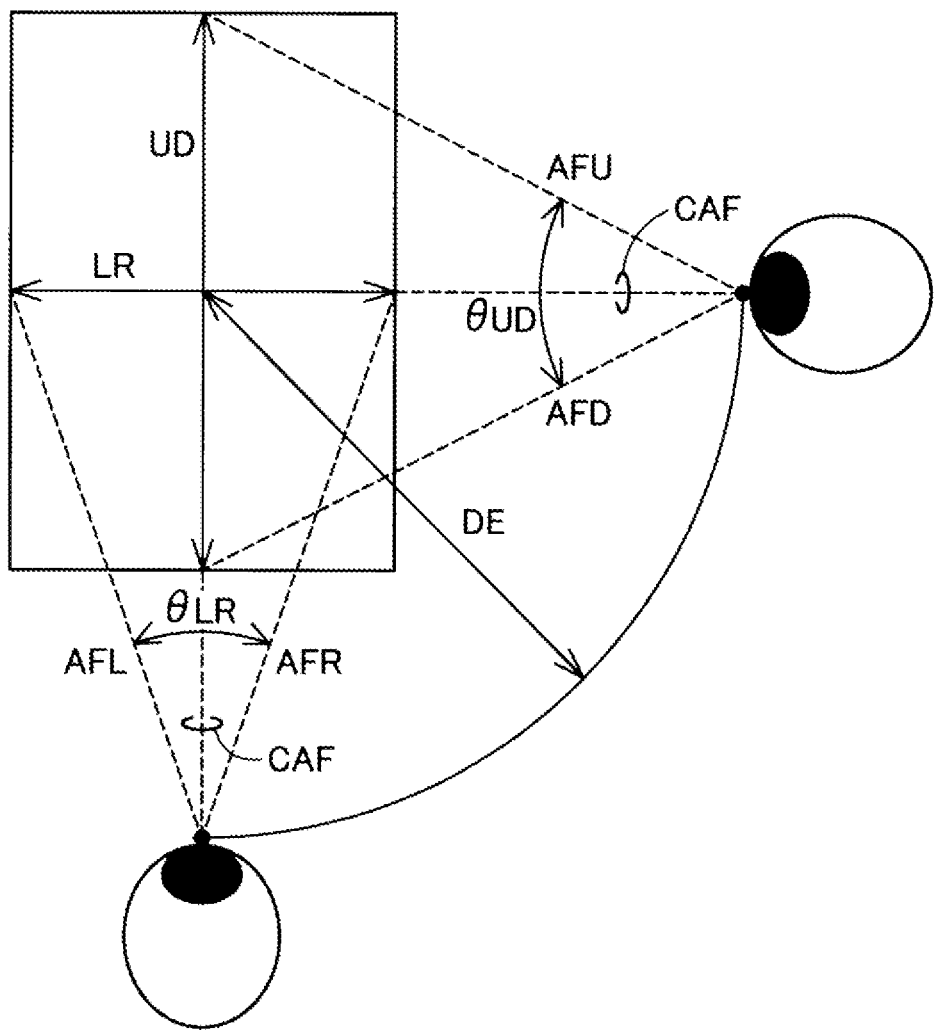
FIG. 6 is an explanatory view schematically illustrating how a viewing angle when an image enters a pupil of the user is sized relative to an aspect of an image.

The significance that the shape of the image PC in the first embodiment is longitudinally elongated will be described below. FIG. 6 is an explanatory view schematically illustrating how the viewing angle when the image finally enters the pupil EY of the user is sized relative to the aspect of the image PC. In FIG. 6, the pupil EY shall be separated from the emission diffraction optical element 35 by a distance DE. At this time, a viewing angle θLR corresponding to the width LR of the image PC is less than a viewing angle θUD corresponding to the height UD of the image PC. The light passing through the central axis of each of the viewing angles is referred to as axis light CAF, the rays of light having viewing angles of ±θLR/2 at the left end and the right end in the width direction are referred to as positive-side width end light AFR and negative-side width end light AFL, respectively, and the rays of light having viewing angles of ±θUD/2 at the upper end and the lower end in the height direction are referred to as positive-side height end light AFU and negative-side height end light AFD, respectively.

The incident diffraction optical element 33 and the emission diffraction optical element 35 are diffraction elements, where the diffraction angle α of these elements follows the above-described Equation (1). Thus, in an incident diffraction optical element 33, the light from the display 51 is not incident on the incident diffraction optical element 33 at an identical angle, but the incident angle with respect to the incident diffraction optical element 33 differs between the center of the display 51, and the left and right ends and the upper and lower ends of the display 51. Supposing that the wavelength A of the light being incident is constant and the pitch d of the interference fringes of the incident diffraction optical element 33 is selected such that the diffraction efficiency of the incident diffraction optical element 33 with respect to the light of the center of the display 51, which is the axis light CAF, is maximized, the diffraction efficiency at the left and right ends and the upper and lower ends is lower than the diffraction efficiency with respect to the axis light CAF. The decrease in the diffraction efficiency becomes greater as the angle of the light being incident deviates from a. Accordingly, the decrease in the diffraction efficiency with respect to the positive/negative-side width end light AFL and AFR at the left and right ends in the width direction becomes the greatest.

Figure 7:
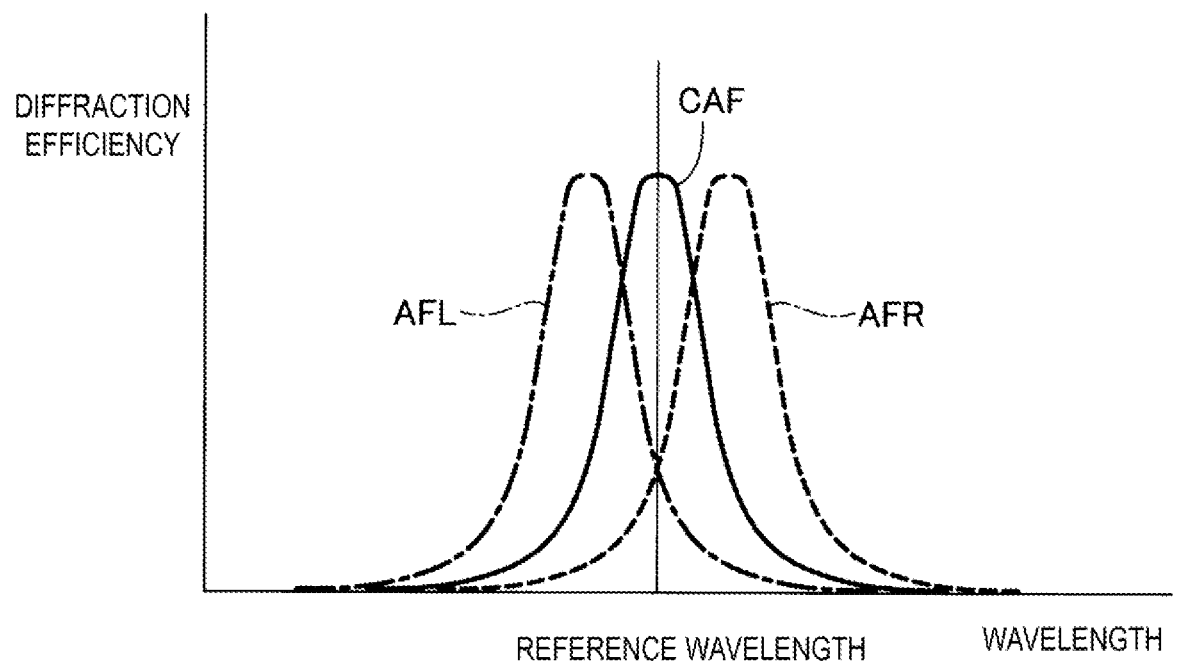
FIG. 7 is an explanatory view illustrating a relationship between wavelength and diffraction efficiency for positive-side width end light, negative-side width end light, and axis light at left and right ends of an image.
Figure 8:
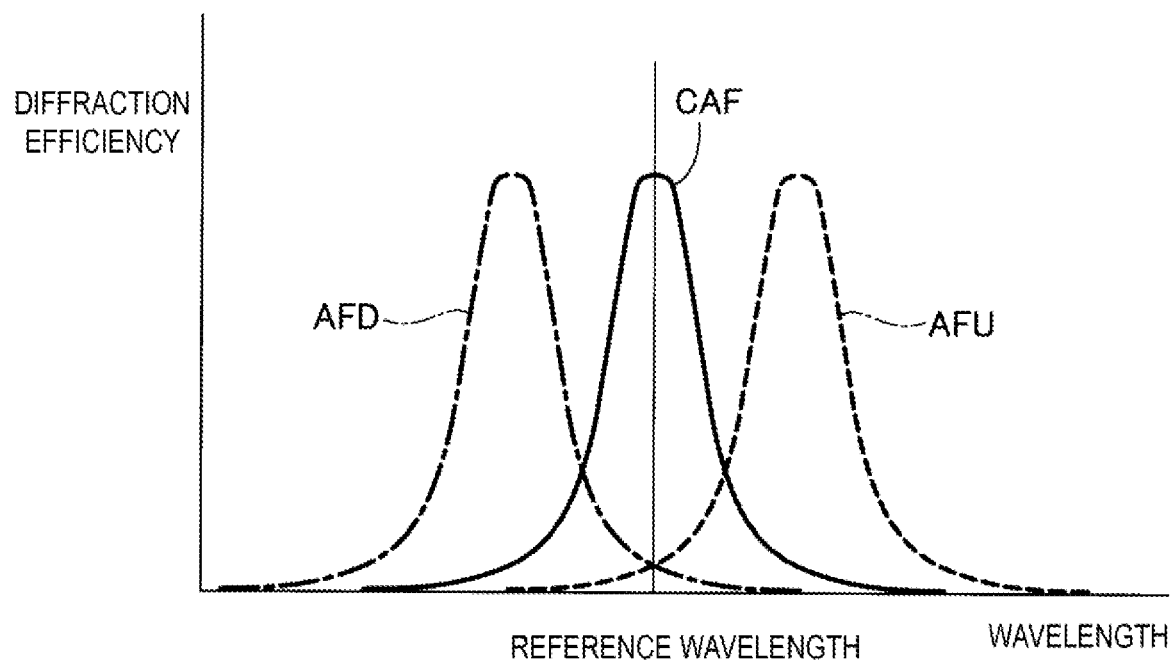
FIG. 8 is an explanatory view illustrating a relationship between wavelength and diffraction efficiency for positive-side width end light, negative-side width end light, and axis light at upper and lower ends of an image.

Similarly, in consideration of the diffraction efficiency with respect to the positive/negative-side height end light AFU and AFD at the upper and lower ends, the height UD is greater than the width RL, and thus, the diffraction efficiency at the positive/negative-side height end light AFU and AFD becomes lower than the diffraction efficiency with respect to the positive/negative-side width end light AFR and AFL at the left and right ends. This state is illustrated in FIGS. 7 and 8. FIG. 7 illustrates the relationship between the wavelength and the diffraction efficiency for the positive/negative-side width end light AFR and AFL at the left and right ends, and the axis light CAF, when plotting the wavelength on the lateral axis and the diffraction efficiency on the longitudinal axis. Similarly, FIG. 8 illustrates the relationship between the wavelength and the diffraction efficiency for the positive/negative-side height end light AFU and AFD at the upper and lower ends, and the axis light CAF.

As illustrated in the figure, because the pitch and the like of the interference fringes of the diffraction elements are adjusted such that the light of the wavelength (reference wavelength) to be diffracted becomes the maximum efficiency at the axis light CAF, the diffraction efficiency of with respect to the positive/negative-side width end light AFR and AFL at the left and right ends decreases at the standard wavelength. As is recognizable from the above-described Equation (1), this may also be described as that the wavelengths with the maximum efficiency shift to the short wavelength side and the long wavelength side, respectively, as it goes from the axis light to the left and right ends. The decrease in diffraction efficiency, or the shift in wavelength of maximum efficiency, increases as the viewing angle becomes apart from the designed value (In normal, the normal line), as can be seen by comparing FIG. 7 and FIG. 8. Such a decrease in diffraction efficiency and such a shift in wavelength of maximum efficiency occur, in the incident diffraction optical element 33 and the emission diffraction optical element 35, in a direction that alters the direction of the incident light, that is, in the light guide direction. In other words, the decrease in diffraction efficiency and the shift in wavelength of maximum efficiency occur in the pitch direction of the interference fringes. On the other hand, the decrease in diffraction efficiency and the shift in wavelength of maximum efficiency do not occur in the direction orthogonal to the pitch direction, that is, in the direction of the fringe of the interference fringes.

In the display device 20 of the first embodiment, as illustrated in FIGS. 1 to 3, the direction in which light is guided by the left-eye display unit 30 and the right-eye display unit 40 is set to the left-right direction, and moreover, the image PC formed by the display 51 is set to be longitudinally elongated, that is, the width RL of the image in the direction in which light is guided is set to be less than the height UD of the image in the direction orthogonal to the light guide direction. Thus, while at the end portion in the width direction of the image PC, the brightness of light of specific wavelengths is reduced than at the center portion, the reduction rate is suppressed. Supposing that the image PC formed by the display 51 is laterally elongated, the brightness at the end portion in the width direction of the image PC is greatly reduced compared to the first embodiment. Assuming that the rays of light incident on the incident diffraction optical element 33 or the emission diffraction optical element 35 include light in a predetermined wavelength range, when the axis light CAF is compared to the positive/negative-side width end light AFR and AFL at the left and right ends, the peak wavelengths, in the positive/negative-side width end light AFR and AFL, transition to the long wavelength side and the short wavelength side, respectively, as can be seen from FIG. 7. A calculation is conducted on the premise that the aspect ratio of the image is 16 to 9 and the diagonal viewing angle is about 23 degrees, to obtain the result that the transition of the peak wavelength are approximately R: about ±17 nm, G: about ±15 nm, and B: about ±12 nm, for each of the light of RGB. In contrast, supposing that the image PC formed by the display 51 is laterally elongated, the positive/negative-side height end light AFU and AFD have the peak wavelengths greatly transitioned with respect to the axis light CAF, as illustrated in FIG. 8. The transition of the peak wavelength is approximately R: about ±30 nm, G: about ±25 nm, and B: about ±20 nm, for each of the light of RGB. As a result, assuming that the light being incident includes light in a predetermined wavelength range, whether the image is longitudinally elongated or laterally elongated, unevenness in brightness or color shifting occurs at both ends compared to the center, however, in the first embodiment in which light is guided in the horizontal direction, a longitudinally elongated image, that is, an image in which the dimension along the direction in which light is guided is shorter than the dimension along the direction orthogonal to the light guide direction is formed on the display 51 and is thus guided, thus suppressing unevenness of brightness and color shifting at the end portion.

Further, in the display device 20 according to the first embodiment, the incident diffraction optical element 33 and the emission diffraction optical element 35 are used in pairs in the left and right-eye display units 30 and 40. Thus, the display device 20 can be thinned and miniaturized and moreover, light can be guided though the light guide body 31 while maintaining angular information included in the viewing angle of light from the image formed by the display 51. Furthermore, in the first embodiment, a reflection-type volume hologram including interference fringes having uniform intervals in the in-plane direction and uniform inclinations in the depth direction is used as the diffraction optical element, to thus make it possible to achieve high transparency, facilitating simultaneous viewing of the external scene and the image formed on the display 51.

Moreover, in the first embodiment, the light incident on the pupil EY of the user is reflected light from the emission diffraction optical elements 35 and 45, where the emission diffraction optical elements 35 and 45 transmit light of a wavelength other than the reflected light, thus facilitating viewing of the external scene through the emission diffraction optical elements 35 and 45. In addition, in the first embodiment, the display device 20 has an eyeglasses-like shape, thus reducing a feeling of strangeness when wearing the display device 20.

B. Second Embodiment

Figure 9:
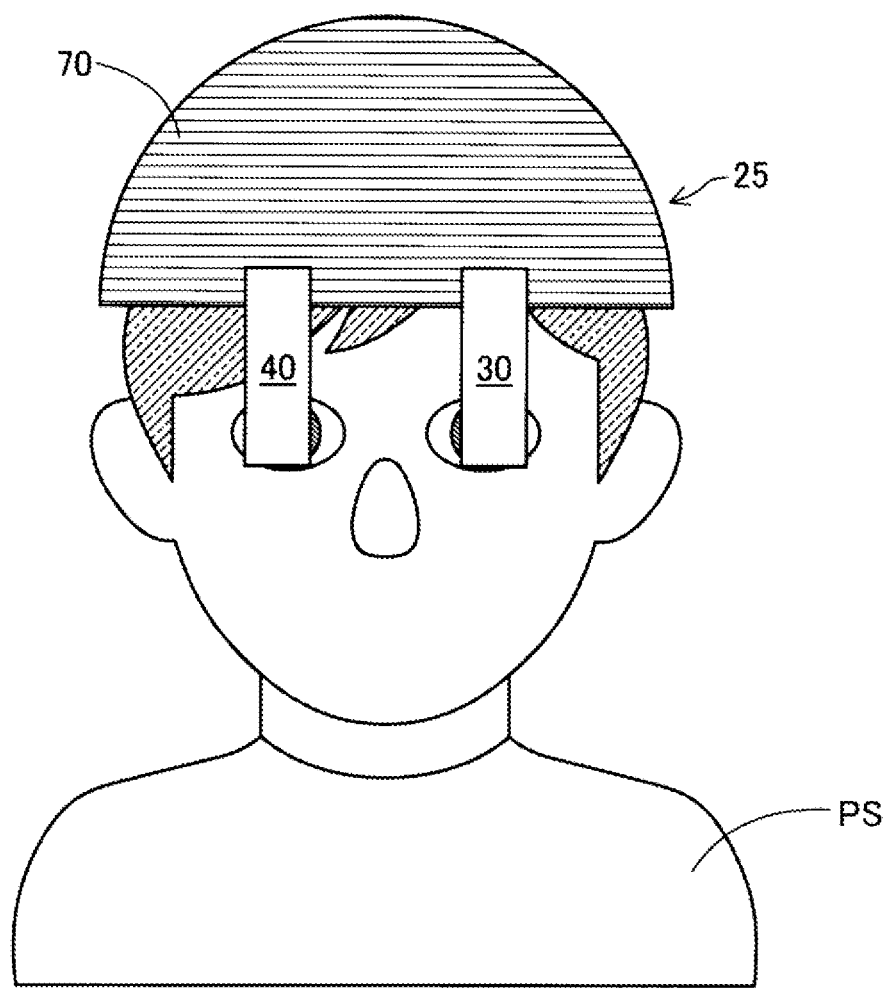
FIG. 9 is a configuration view schematically illustrating a display device according to a second embodiment.
Figure 10:
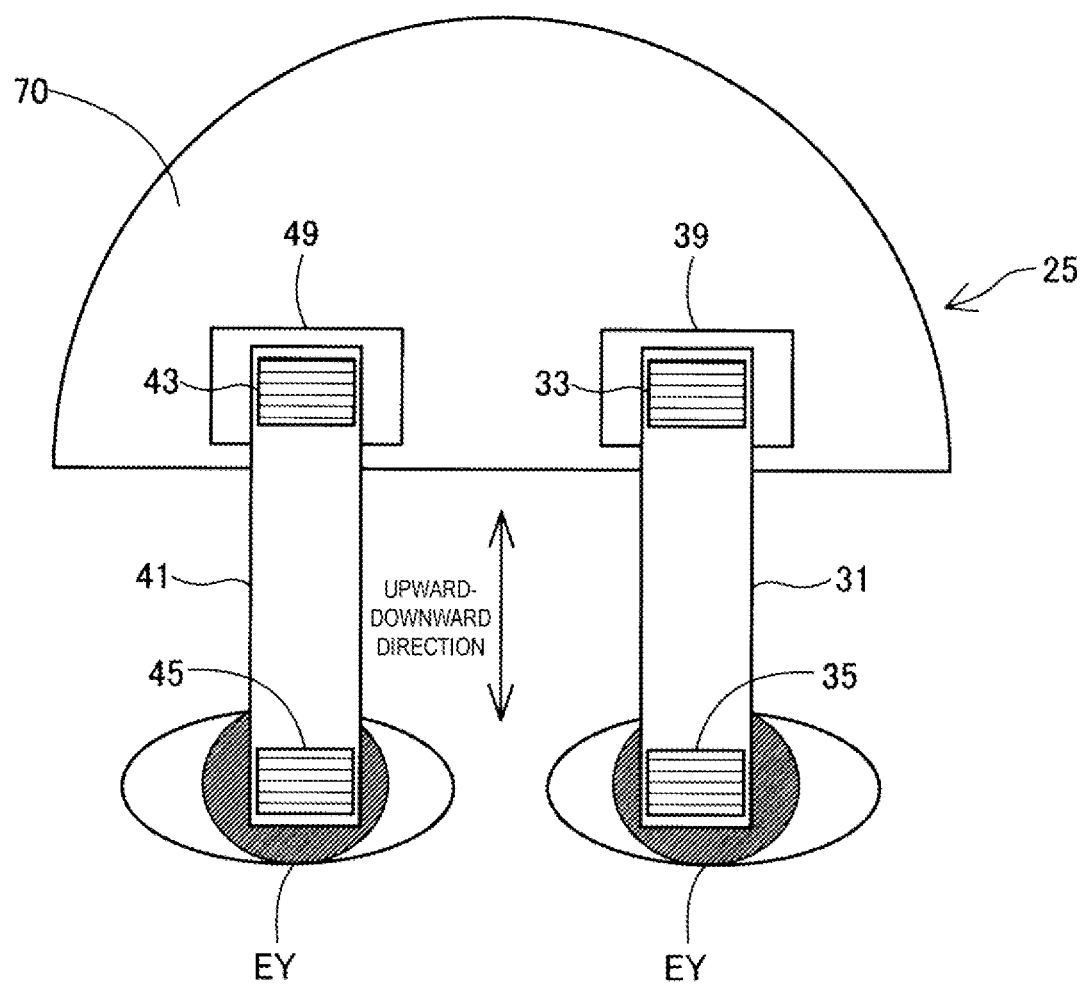
FIG. 10 is an explanatory view illustrating an arrangement of an optical system according to a second embodiment.

Next, a display device 25 according to the second embodiment will be described below. As illustrated in FIGS. 9 and 10, the display device 25 according to the second embodiment includes a head-mounting tool 70 to be mounted on the head of the user, where the left-eye display unit 30 and the right-eye display unit 40 are provided in the upward-downward direction from the head-mounting tool 70. The left-eye display unit 30 and the right-eye display unit 40 have the same configuration as in the first embodiment. As a matter of course, it is permitted, similar to the first embodiment, that the display device 25 is of an eyeglasses type, the EL display 51 is provided upward or downward from the pupil EY, and the left-eye display unit 30 and the right-eye display unit 40 are arranged along the upward-downward direction.

The head-mounting tool 70 is provided with the image forming units 39 and 49 in correspondence to the left-eye display unit 30 and the right-eye display unit 40. The image forming units 39 and 49 have the same configuration as in the first embodiment (see FIG. 2), where the image formed on the display 51 is incident on the incident diffraction optical elements 33 and 43 of the left-eye display unit 30 and the right-eye display unit 40, and is guided, through the light guide bodies 31 and 41, to the emission diffraction optical elements 35 and 45.

In the second embodiment, the configurations of the left-eye display unit 30 and the right-eye display unit 40 are the same as in the first embodiment, thus, the image formed by the display 51 is laterally elongated with respect to the user. That is, the image formed in front of the pupil EY of the user PS is laterally elongated as in a typical TV set or display device of a computer. However, the relationship between the aspect ratio of the image and the light guide direction is the same as in the first embodiment.

In the second embodiment as well, a change in the reflection efficiency or a transition in the peak wavelength occurs depending on the viewing angle of light with respect to the incident diffraction optical elements 35 and 45 and the emission diffraction optical elements 35 and 45, however, such a change or a transition occurs in the direction in which light is guided (the light guide direction of the light guide bodies 31 and 41), but does not occur in the width direction of the light guide bodies 31 and 41. As a result, assuming that the light being incident includes light in a predetermined wavelength range, whether the image is longitudinally elongated or laterally elongated, unevenness in brightness or color shifting occurs at both ends compared to the center, however, in the second embodiment in which light is guided in the upward-downward direction, a longitudinally elongated image, that is, an image in which the dimension along the direction (the longitudinal dimension) of the guided light is shorter than the dimension along the direction orthogonal to the direction in which light is guided (the lateral dimension) is formed on the display 51 and is thus guided, thus suppressing unevenness of brightness and color shifting at the end portions.

Moreover, in the second embodiment, the unevenness in brightness and color occurs in the same upward-downward direction and in the same manner for the left and right eyes, thus reducing a feeling of strangeness. In addition, the second embodiment achieves the same function and effect as in the first embodiment. In the second embodiment as well, the emission diffraction optical element 35 corresponds to the first diffraction optical element and the incident diffraction optical element 33 corresponds to the second diffraction optical element, however, when using a single diffraction optical element, the incident diffraction optical element 33 used at the incident side of the light guide body 31 corresponds to the first diffraction optical element.

C: Third Embodiment

Figure 11:
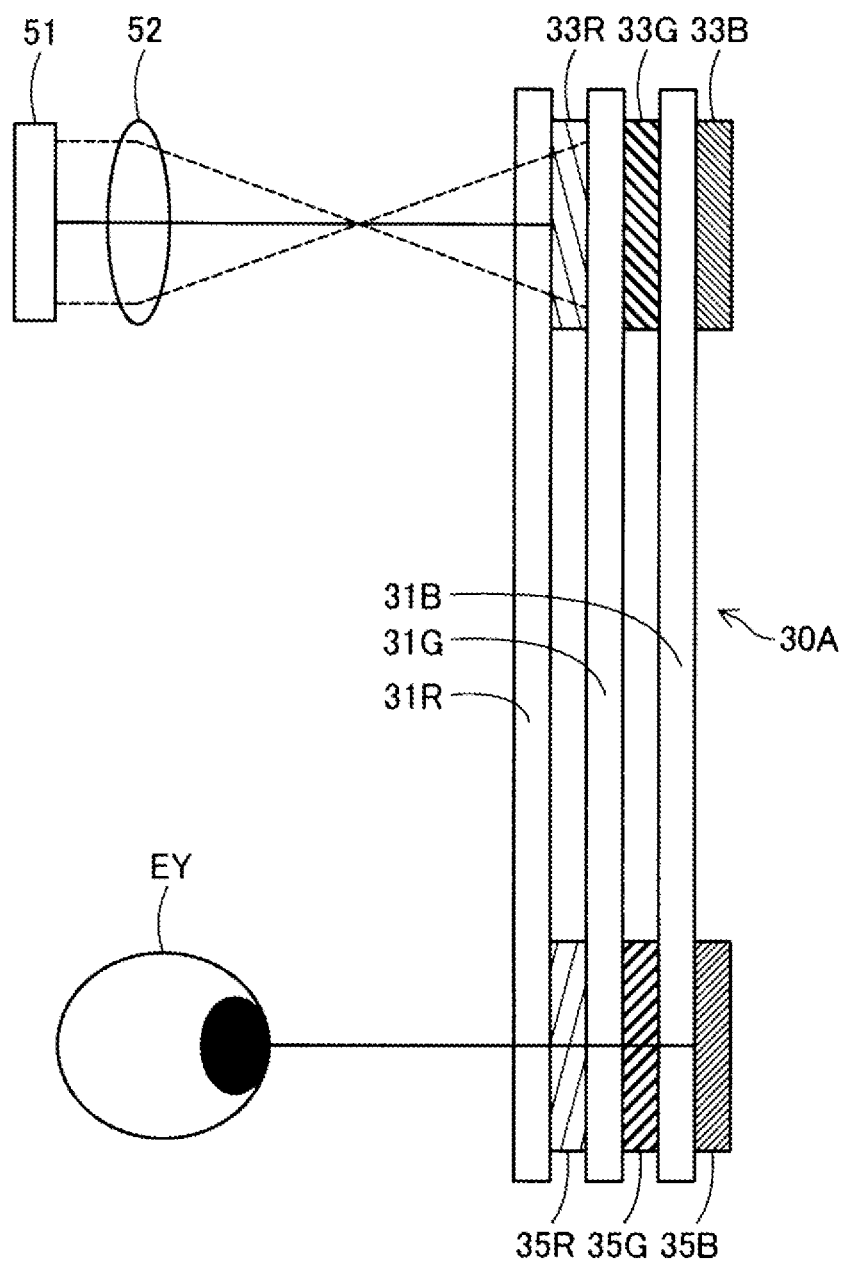
FIG. 11 is an explanatory view schematically illustrating a structure of a left-eye display unit according to a third embodiment.

Next, the third embodiment will be described below. The display device of the third embodiment has the same overall configuration as in the display devices 20 or 25 of the first or second embodiments, and only the configurations of the right and left-eye display units differ. FIG. 11 is an explanatory view schematically illustrating the structure of a left-eye display unit 30A of these. Note that the right-eye display unit also has the same configuration as the above.

The left-eye display unit 30A includes an EL display 51 configured to form a full color image, and light guide paths configured to guide image light of red (R) corresponding to the first image light emitted from the display 51, image light of green (G) corresponding to the second image light, and image light of blue (B) corresponding to the third image light, respectively. That is, the EL display 51 can emit light of red (R), green (G), and blue (B) in unit of pixels, and the left-eye display unit 30A includes three light guide paths that individually guide image light of these red (R), green (G), and blue (B). The light guide path for red light R is composed of an incident diffraction optical element 33R, a light guide body 31R, and an emission diffraction optical element 35R, the light guide path for green light G is composed of an incident diffraction optical element 33G, a light guide body 31G, and an emission diffraction optical element 35G, and the light guide path for the blue light B is composed of an incident diffraction optical element 33B, a light guide body 31B, and an emission diffraction optical element 35B. The left-eye display unit 30A has a configuration in which the three light guide paths are layered. Even when being layered in such a manner, the diffraction optical element transmits light excluding light of a wavelength designed to be diffracted, and thus, for example, of the light of RGB, the light of B passes through the incident diffraction optical element 33R for R and the incident diffraction optical element 33G for G that are present on the side of the display 51, and reaches the incident diffraction optical element 33B for B. Of the light of RGB, the light of G also passes through the incident diffraction optical element 33R in the foreground.

The left-eye display unit 30A illustrated in FIG. 11, which guides three primary colors of RGB from the EL display 51 to the pupil EY of the user through three light guide paths individually prepared corresponding to the light of each of the colors, can display a full color image. Moreover, because any of the images displayed have the dimension along the light guide direction less than the dimension along the width direction orthogonal to the light guide direction, the deviation of the peak wavelength is suppressed for any of the RGB compared to the case where the longitudinally elongated/laterally elongated for the images are reversed. The deviation of the peak wavelength of each of the colors of RGB is suppressed, then the color unevenness of the entire image is reduced. Note that the right-eye display unit also has the same configuration as the above, and thus the same effect as the above can be achieved as an image display for the right-eye. Moreover, the other function and effect of the display device as a whole are the same as in the first and second embodiments.

D. Fourth Embodiment

Figure 12:
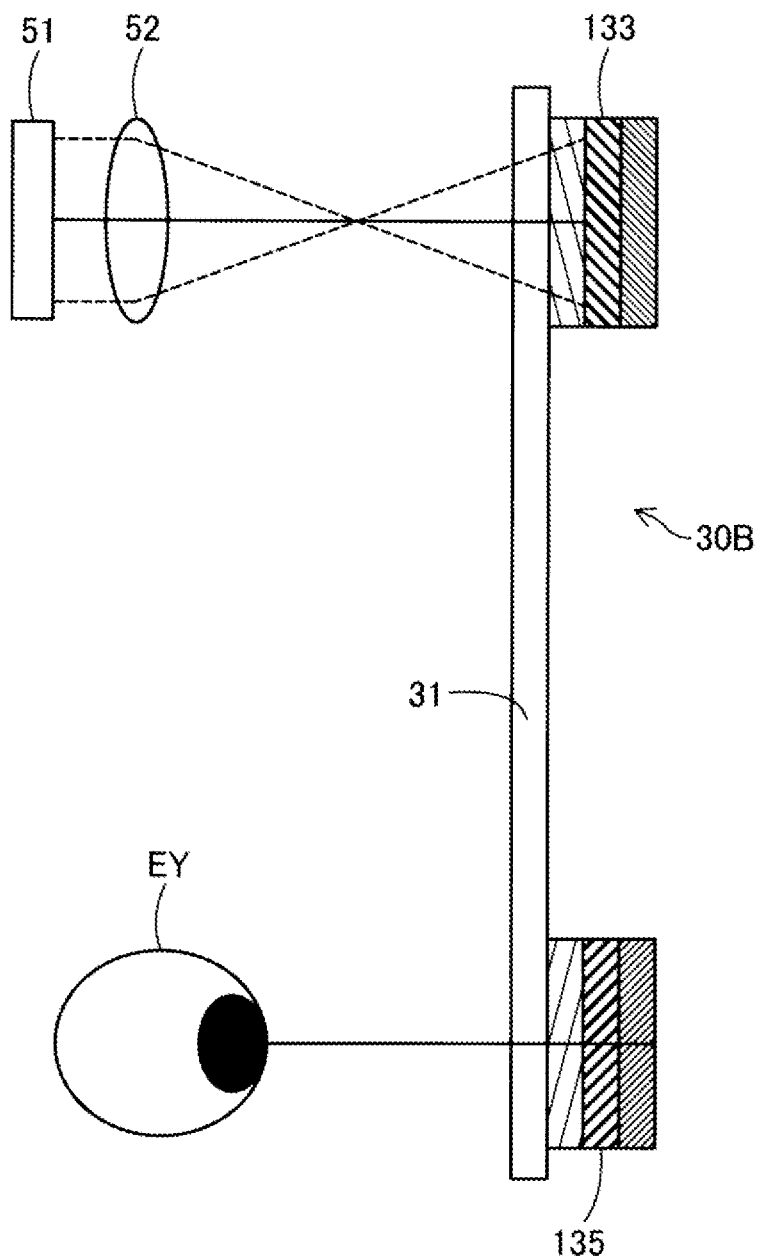
FIG. 12 is an explanatory view schematically illustrating a structure of a left-eye display unit according to a fourth embodiment.

Next, the fourth embodiment will be described below. The display device according to the fourth embodiment has the same overall configuration as in the display devices 20 or 25 of the first or second embodiments, and only the configurations of the right and left-eye display units differ. FIG. 12 is an explanatory view schematically illustrating the structure of a left-eye display unit 30B of these. Note that the right-eye display unit also includes the same configuration as the above.

The left-eye display unit 30B guides three primary colors, which are RGB forming a full color image in the EL display 51, to the pupil EY of the user through an identical single light guide path. As in the third embodiment, the EL display 51 can emit light of red (R), green (G), and blue (B) in unit of pixels, and emits image light of red (R) corresponding to the first image light, image light of green (G) corresponding to the second image light, and image light of blue (B) corresponding to the third image light. The left-eye display unit 30B includes an incident diffraction optical element 133 for three primary colors of RGB and an emission diffraction optical element 135 for three primary colors of RGB on a single piece of the light guide body 31. The incident diffraction optical element 133 and the emission diffraction optical element 135 are configured such that the diffraction optical element for each of the colors of three primary colors of RGB are layered or superimposed, where the diffraction optical element transmits light excluding light of a wavelength designed to be diffracted, and thus the light of each of the colors reaches the position of the corresponding diffraction optical element.

The left-eye display unit 30B illustrated in FIG. 12, which guides three primary colors of RGB from the EL display 51 to the pupil EY of the user through the single piece of the light guide body 31 collectively prepared for the light of each of the colors, can thin the device configuration. Moreover, the left-eye display unit 30B can display a full color image. At this time, as in the third embodiment, because any of the images displayed have the dimension along the direction in which light is guided less than the dimension along the width direction orthogonal to the light guide direction, the deviation of the peak wavelength is suppressed for any of the RGB compared to the case where the longitudinally elongated/laterally elongated for the images are reversed. The deviation of the peak wavelength of each of the colors of RGB is suppressed, then the color unevenness of the entire image is reduced. Note that the right-eye display unit also has the same configuration as the above, and thus the same effect as the above can be achieved as an image display for the right-eye. Moreover, the other function and effect of the display device as a whole are the same as in the first and second embodiments.

Figure 13:
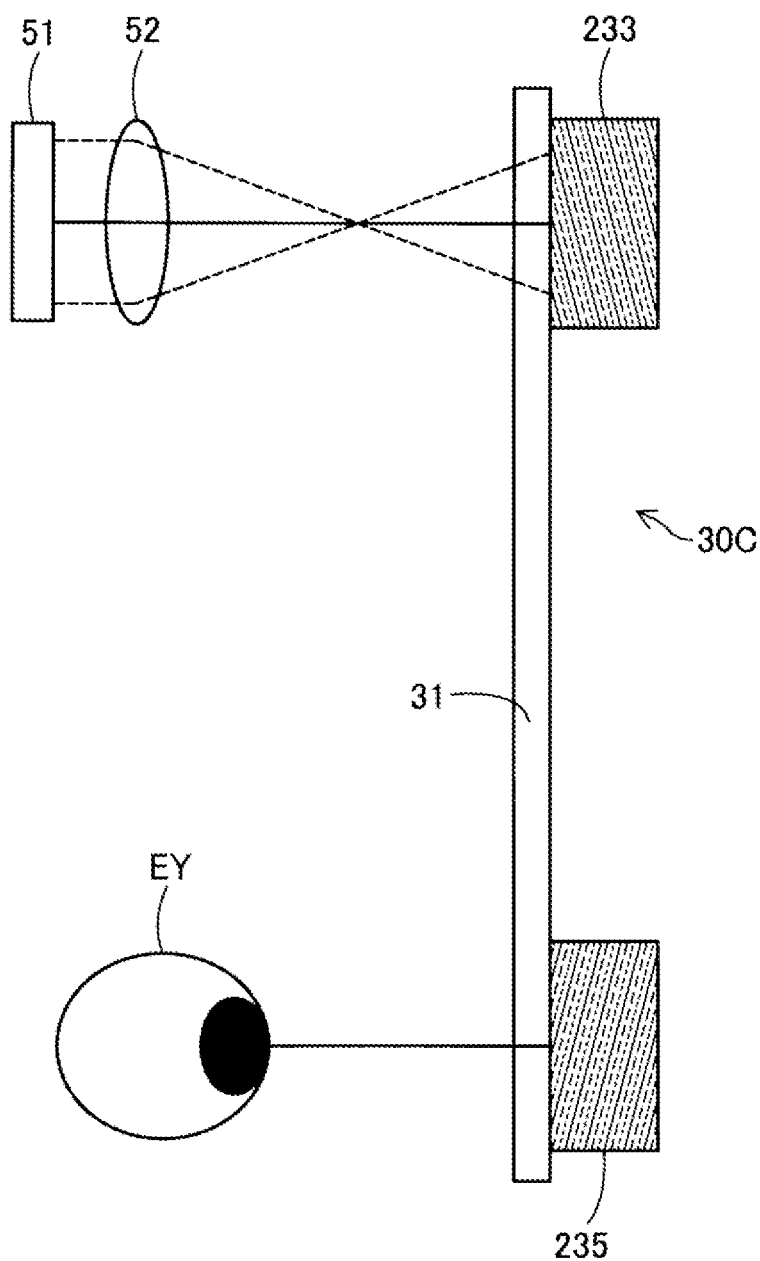
FIG. 13 is an explanatory view schematically illustrating a structure of a left-eye display unit according to other embodiments.

In the fourth embodiment, the diffraction optical element that individually deflects each of the light of RGB, which is three primary colors, is used in a manner layered or superimposed, and as the modification of a left-eye display unit 30C is illustrated in FIG. 13, an integrated hologram in which interference fringes corresponding to the each of the colors are formed in the diffraction optical element is permitted to be used as an incident diffraction optical element 233 and an emission diffraction optical element 235.

E. Other Embodiments

In the above-described embodiments, the display devices 20 and 25 are of a see-through type through which the external scene can be visually recognized, but the display devices 20 and 25 are not necessarily of the see-through type. Further, the display device for a single eye may also be used without being limited to the binocular type. The image formed on the EL display 51 is not limited to the aspect ratio of 16 to 9, and is permitted to be other aspect ratios such as 4 to 3. Further, the image to be displayed is not necessarily limited to a rectangular shape in a mathematical sense, and is permitted as long as having a longitudinally elongated/laterally elongated shape as a whole. In addition, the shape of the EL display 51 itself need not match the shape of the image displayed.

In the third and fourth embodiments, a diffraction optical element is prepared corresponding to each of the colors of RGB, which are three primary colors, however, the colors are not necessarily limited to three primary colors. For example, the colors may be achieved as a combination of two colors, such as RG, GB, or RB. Moreover, the colors may be achieved as a combination of the third and fourth embodiments. For example, the colors may be achieved as a combination such as R/GB, RG/B, or G/RB. In addition, the colors need not be limited to RGB, and the display device may be configured as a combination of different colors, such as Y, C, and M.

The diffraction optical element is not necessarily limited to a reflection-type volume hologram, and may be other diffractive element. For example, the diffraction optical element may be configured to include a transmission type volume hologram on the side of the plane on which light from the EL display 51 is incident, and may also employ a surface relief hologram having concavities and convexities on the surface of the base material.

Further, the present disclosure may be achieved in the form of the following aspects.

(1) A display device includes an image forming unit configured to form an image having an aspect ratio not equal to 1:1 and to emit the image as image light, an optical system configured to guide the image light to a display position, and a first diffraction optical element having a pattern that diffracts light and configured to deflect the image light in the optical system. Here, the first diffraction optical element may be disposed such that, at a plane of the first diffraction optical element on which the image light is incident, a pitch direction of the pattern coincides with a direction in which an aspect of the image is narrow. This allows the display device to suppress unevenness in brightness and color unevenness of the image displayed.

(2) A display device includes an image forming unit configured to form an image having an aspect ratio not equal to 1:1 and to emit the image as image light, an optical system configured to guide the image light to a display position, and a first diffraction optical element provided in the optical system and configured to deflect a traveling direction of the image light toward a direction in which an aspect of the image is narrow. This also allows the display device to suppress unevenness in brightness and color unevenness of the image displayed.

(3) In such a display device, the optical system may include a light guide body configured to guide the image light, and the first diffraction optical element may be provided at an emission side of the light guide body. The emission side is located near the pupil of a person using the display device, which is desirable for the display device to be thinned and miniaturized.

(4) The display device may further include a second diffraction optical element configured to deflect a traveling direction of the image light toward the direction in which an aspect of the image is narrow, in which the second diffraction optical element may be provided at an incident side of the light guide body. The use of the second diffraction optical element at the incident side of the light guide body enables the display device to be further thinned and miniaturized, and moreover, the image light can be guided through the light guide body while maintaining angular information included in the viewing angle of the image light.

(5) In such a display device, the first diffraction optical element may be a reflection-type volume hologram configured by planar interference fringes. This also allows the image light to be guided through the light guide body while maintaining angular information included in the viewing angle of the image light. Further, the reflection-type volume hologram, which selectively diffracts light of a particular wavelength, makes light of other wavelengths pass through the reflection-type volume hologram. This makes it possible to achieve high transparency, facilitating simultaneous viewing of the external scene and the image formed by the image forming unit.

(6) In such a display device, the image light emitted from the image forming unit may include first image light and second image light having different wavelengths from each other, and the first diffraction optical element may be configured such that first interference fringes corresponding to a wavelength of the first image light and second interference fringes corresponding to a wavelength of the second image light are layered or superimposed. This facilitates displaying of a color image of the first image light and the second image light having different wavelengths from each other.

(7) In such a display device, the image light emitted from the image forming unit may include first image light, second image light, and third image light having different wavelengths from one another, and the first diffraction optical element may be configured such that first interference fringes corresponding to a wavelength of the first image light, second interference fringes corresponding to a wavelength of the second image light, and third interference fringes corresponding to a wavelength of the third image light are layered or superimposed. This facilitates displaying of a color image of the first image light, the second image light, and the third image light having different wavelengths from one another.

(8) The peak wavelength of the first image light may be red (R), the peak wavelength of the second image light may be green (G), and the peak wavelength of the third image light may be blue (B). This allows the display device to display a full color.

(9) Such a display device may include a support portion for mounting the display device on a head, in which the optical system may be disposed to guide the image light from an outer side in a left-right direction of the head to the display position in a center portion direction, and the direction in which the aspect of the image formed by the image forming unit is narrow may coincide with the left-right direction. This makes it possible to achieve a display device having a shape similar to eyeglasses, thus mitigating a feeling of strangeness when the display device is mounted on a head.

(10) Such a display device may include a support portion for mounting the display device on a head, in which the optical system may be disposed to guide the image light from an outer side in an upward-downward direction of the head to the display position in a center portion direction, and the direction in which the aspect of the image formed by the image forming unit is narrow may coincide with the left-right direction. This allows a laterally elongated image to be displayed with suppressed brightness and color unevenness.

(11) In each of the above-described embodiments, a part of a configuration achieved by hardware may be replaced with software. At least a part of the configuration achieved by software can be achieved by a discrete circuit arrangement. Further, in a case where part of the functions or the entire functions of the invention is achieved by software, the software (computer program) may be provided in a form stored in a computer-readable recording medium. The term "computer-readable recording medium" is not limited to a portable recording medium such as a flexible disk and a CD-ROM, but includes various internal storage devices such as a RAM and a ROM and various external storage devices fixed to a computer such as a hard disk. That is, the term "computer-readable recording medium" encompasses a broad range of definition including any recording device capable of non-transitorily and fixedly storing data.

The present disclosure is not limited to the embodiments described above, and can be achieved in various configurations without departing from the gist of the disclosure. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A display device comprising:
   an image forming unit that emits an image having an aspect ratio not equal to 1:1 as an image light; and
   a light guide body that includes:
      a first diffraction optical element being provided at an emission side and deflecting the image light to a display position, and
      a second diffraction optical element being provided at an incident side and deflecting the image light along a left-right direction in which an aspect of the image is narrow, wherein
   each of the first diffraction optical element and the second diffraction optical element is disposed such that a pitch direction of the pattern coincides with the left-right direction,
   the image light emitted from the image forming unit includes a first image light and a second image light having different wavelengths from each other,
   in the first diffraction optical element, first interference fringes corresponding to a wavelength of the first image light and second interference fringes corresponding to a wavelength of the second image light are layered or superimposed,
   in the first diffraction optical element, each of the first interference fringes and the second interference fringes extends along an upward-downward direction in which an aspect of the image is wide,
   in the second diffraction optical element, first interference fringes corresponding to a wavelength of the first image light and second interference fringes corresponding to a wavelength of the second image light are layered or superimposed, and
   in the second diffraction optical element, each of the first interference fringes and the second interference fringes extends along the upward-downward direction.

2. The display device according to claim 1, wherein each of the first diffraction optical element and the second diffraction optical element is a reflection-type volume hologram.

3. The display device according to claim 1, wherein the image light emitted from the image forming unit includes a third image light having a different wavelength from the first image light and the second image light, and
   in the first diffraction optical element, the first interference fringes corresponding to the wavelength of the first image light, the second interference fringes corresponding to the wavelength of the second image light, and third interference fringes corresponding to a wavelength of the third image light are layered or superimposed.

4. The display device according to claim 3, wherein a peak wavelength of the first image light is red (R), a peak wavelength of the second image light is green (G), and a peak wavelength of the third image light is blue (B).

5. The display device according to claim 1, comprising a support portion that is mounted to the display device on a head.

6. The display device according to claim 1, wherein the first diffraction optical element includes separate diffraction elements for each image light that are layered.

7. The display device according to claim 6, wherein the light guide body includes separate light guide bodies for each image light.

8. A display device comprising:
   an image forming unit that emits an image having an aspect ratio not equal to 1:1 as an image light;
   a support portion that is mounted the display device on a head, and
   a light guide body that includes:
      a first diffraction optical element being provided at an emission side and deflecting the image light to a display position, and
      a second diffraction optical element being provided at an incident side and deflecting the image light along an upward-downward direction which an aspect of the image is narrow, wherein
   each of the first diffraction optical element and the second diffraction optical element is disposed such that a pitch direction of the pattern coincides with the upward-downward direction,
   the image light emitted from the image forming unit includes a first image light and a second image light having different wavelengths from each other,
   in the first diffraction optical element, first interference fringes corresponding to a wavelength of the first image light and second interference fringes corresponding to a wavelength of the second image light are layered or superimposed, in the first diffraction optical element, each of the first interference fringes and the second interference fringes extends along a left-right direction in which an aspect of the image is wide, in the second diffraction optical element, first interference fringes corresponding to a wavelength of the first image light and second interference fringes corresponding to a wavelength of the second image light are layered or superimposed, in the second diffraction optical element, each of the first interference fringes and the second interference fringes extends along the left-right direction, and the light guide body is disposed to guide the image light from an outer side in an upward-downward direction with respect to the head to the display position in a center portion direction.

9. The display device according to claim 8, comprising a support portion that is mounted to the display device on a head.

\* \* \* \* \*